United States Patent [19]

Rammler et al.

[11] 4,054,492
[45] Oct. 18, 1977

[54] PROCESS FOR TREATING BITUMINOUS OR OIL-CONTAINING MATERIAL USING DRY DISTILLATION

[75] Inventors: Roland Rammler, Konigstein; Hans-Jurgen Weiss, Frankfurt am Main, both of Germany

[73] Assignee: Metallgesellschaft Aktiengesellschaft, Frankfurt am Main, Germany

[21] Appl. No.: 659,823

[22] Filed: Feb. 20, 1976

[30] Foreign Application Priority Data

Feb. 28, 1975 Germany .............................. 2508707

[51] Int. Cl.² .................... C10B 49/16; C10B 55/02; C10B 57/04
[52] U.S. Cl. ...................................... 201/12; 201/17; 201/20; 201/22; 208/11 R
[58] Field of Search ..................... 201/12, 17, 20, 22, 201/28, 29; 208/11 R; 423/244

[56] References Cited

U.S. PATENT DOCUMENTS

| 3,655,518 | 4/1972 | Schmalfeld et al. | 201/12 X |
| 3,661,719 | 5/1972 | Kelmar | 201/17 |
| 3,661,722 | 5/1972 | Peters et al. | 201/12 X |
| 3,691,056 | 9/1972 | Barney et al. | 208/11 R |
| 3,703,052 | 11/1972 | Linden | 208/11 R X |
| 3,703,442 | 11/1972 | Rammler et al. | 201/12 |
| 3,707,462 | 12/1972 | Moss | 201/17 X |
| 3,756,791 | 9/1973 | Mancke | 201/17 X |
| 3,781,408 | 12/1973 | Ping-Wha Lin | 423/244 |

Primary Examiner—Morris O. Wolk
Assistant Examiner—Arnold Turk
Attorney, Agent, or Firm—Burgess, Dinklage & Sprung

[57] ABSTRACT

A dry distillation process for treating bituminous or oil-containing fine-grained material, particularly tar sand, with a heat carrier comprising fine-grained dry distillation residue which is heated in a pneumatic conveyor line by hot combustion gases and then fed to a collecting vessel and mixed in a dry distillation zone with the fine-grained material to be subjected to dry distillation. The dry distillation residue is heated to a temperature of 600°–850° C before being mixed at least in part with the material which is to be subjected to dry distillation, said material containing at least 0.2% by weight magnesium carbonate and/or calcium carbonate.

9 Claims, 1 Drawing Figure

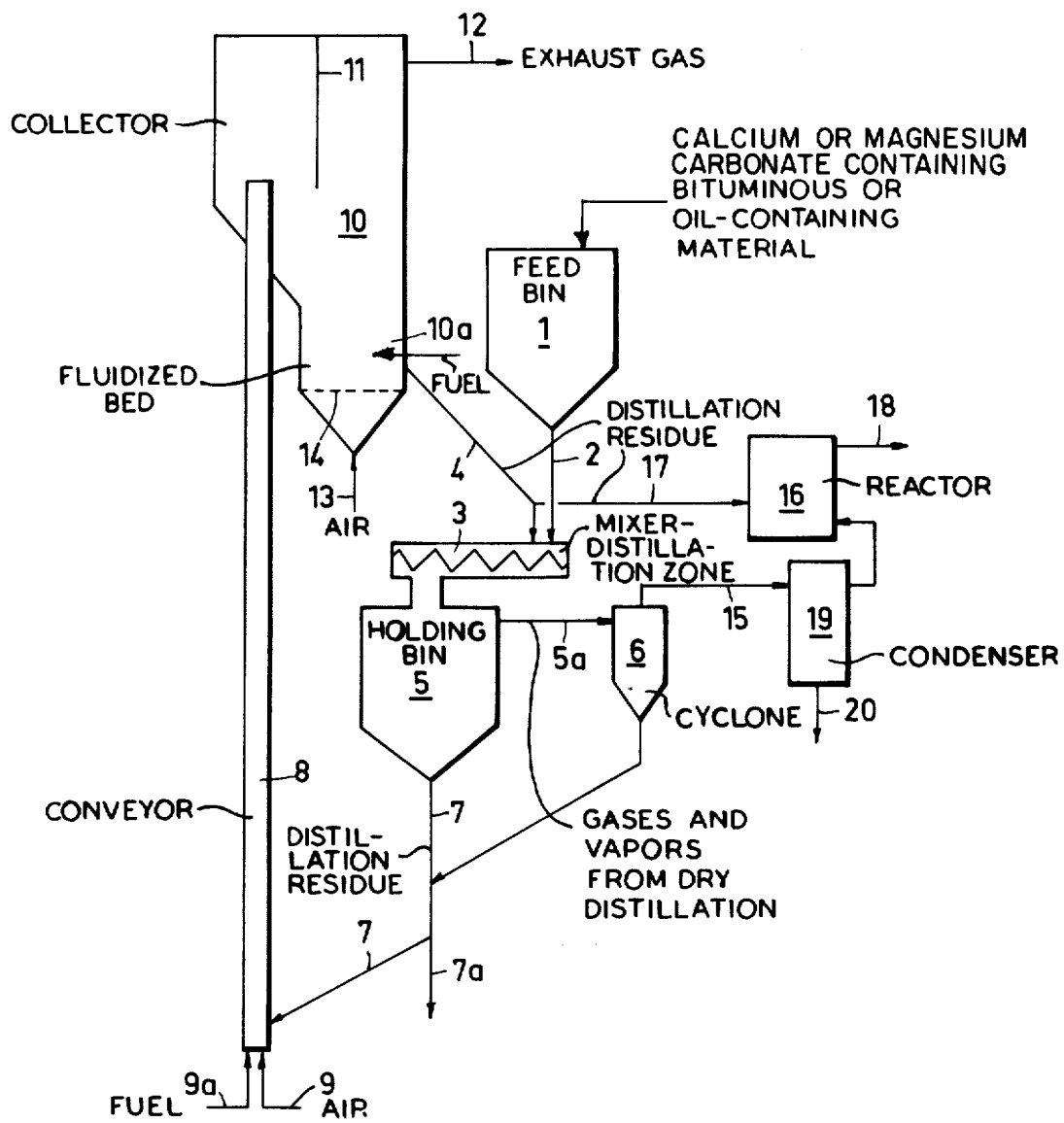

PROCESS FOR TREATING BITUMINOUS OR OIL-CONTAINING MATERIAL USING DRY DISTILLATION

BACKGROUND

This invention relates to a dry distillation process for treating bituminous or oil-containing fine-grained material, particularly tar sand, with a heat carrier made of fine-grained dry distillation residue which is heated in a pneumatic conveyor line by hot combustion gases and then fed to a collecting vessel and mixed in a dry distillation zone with the fine-grained material to be subjected to dry distillation.

Dry distillation processes are known, e.g., from German Pat. Nos. 1,809,874 and 1,909,263 and U.S. Pat. Nos. 3,655,518 and 3,703,442. The materials to be subjected to dry distillation may consist, e.g., of tar sand, oil shale or bituminous marl. The heat carrier is usually distillation residue or a granular additional material. To ensure a high yield of oil, it has been suggested to use temperatures of about 450°–650° C for dry distillation to select temperatures of about 600°–700° C for the hot heat carrier. The dry distillation residue is usually not processed further.

When the feedstocks and/or fuels contain sulfur, the known processes involve a production of exhaust gases which may contain sulfur compounds, particularly $SO_2$, in considerable amounts. Whereas processes known per se may be used to purify and desulfurize these exhaust gases, these known processes involve a considerable expenditure so that the costs of the plant are appreciably increased.

SUMMARY

The invention carries out a dry distillation process in such a manner that the content of sulfur compounds in the exhaust gases is greatly decreased in a simple and economical manner. This is accomplished in accordance with the invention by heating the dry distillation residue to a temperature of 600°–850° C before it is mixed at least in part with the material which is to be subjected to dry distillation, which material contains at least 0.2% by weight magnesium carbonate and/or calcium carbonate.

DESCRIPTION OF THE DRAWING

The drawing is a flow diagram showing the process of the invention.

DESCRIPTION

When the material subjected to dry distillation is heated to these temperatures, the carbonates contained therein eliminate $CO_2$ in accordance with the reaction equations

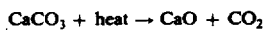

the resulting oxides MgO and/or CaO can combine with sulfur in accordance with the reaction equations

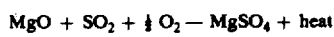

as sulfates which are stable at the temperatures occurring in the process. As a result, the exhaust gases escaping from the collecting vessel of the plant are substantially free from sulfur or have in any case a lower sulfur content.

The $SO_2$-combining reactions are exothermic and depend mainly on the following parameters:

a. Temperature: The conversion rate, i.e., the decrease of the $SO_2$ content of the flue gas in percent, depends highly on temperature and has a maximum between 750° and 850° C. The conversion rate decreases highly below 700° C.

b. Ca/S or Mg/S mole ratio: The conversion rate increases as the mole ratio increases. In practice, favorable conversion rates are obtained with mole ratios between 2 and 5. Ratios above 10 do not result in a substantial further increase of the conversion rate.

c. Particle size: A decrease in particle size, i.e., an increase in surface area, results in a higher conversion rate. For this reason a particle size below 6 mm is preferred.

d. Residence time: High conversion rates above 80% can be obtained at 800° C, even with gas residence times of about 1 second. The solids residence time which is required depends substantially only on the carbonate decomposition rate, which is a function of temperature and particle size. To effect a decomposition of carbonates which is sufficient for desulfurization, the solids residence times at the temperature required for a decomposition of carbonates should be 1 to 40 minutes.

The content of magnesium carbonate and/or calcium carbonate in the material to be subjected to dry distillation is suitably selected in dependence on the rate at which $SO_2$ which is to be combined becomes available. The bituminous or oil-containing raw material may sometimes have sufficient carbonate contents. If this is not the case, additional carbonate is admixed to the tar sand or oil shale before its dry distillation. $MgCO_3$ may be added as dolomite and $CaCO_3$ as limestone.

The granular dry distillation residue may already be heated in the pneumatic conveyor line if air and fuel are added thereto in suitable amounts. Particularly where the dry distillation residue is to be heated to very high temperatures, it may be afterheated in the collecting vessel which succeeds the conveyor line. A separate afterheating results in a saving of energy because a part of the exhaust gas which in case of a single-stage heating would also be heated to the final temperature can now be taken off at a lower temperature.

For afterheating the dry distillation residue, air, possibly as preheated air, is fed to the collecting vessel. Additional fuel, preferably as a gas, will also be fed if the combustible constituents still contained in the dry distillation residue are not sufficient.

This fuel is fed, e.g., directly into the voids between the particles of the material and burns in these voids with the air rising from below. It may also be useful to provide a system of pipes for a uniform distribution of the fuel throughout the cross-section of the reactor. Alternatively, the fuel and air may be fed into the collecting vessel through mixing nozzles known per se, such as are described more fully in German Pat. No. 1,758,244. Afterheating may also be effected by hot gases from a combustion chamber. To maintain the temperature in the collecting vessel as constant as possible, the reactor suitably constitutes a fluidized-bed chamber with or without a grate.

The hot dry distillation residue, which contains MgO and CaO, may well be used to desulfurize gases and vapors produced by dry distillation, e.g., in accordance with the reaction equation $$CaO + H_2S \longrightarrow CaS + H_2O + heat$$

On the other hand, the gases and vapors produced by dry distillation will be by no means completely desulfurized if the usual temperatures and residence times of such gases and vapors are employed. For this reason, the gases and vapors produced by dry distillation are desirably treated with the dry distillation residue in a separate desulfurizer. All kinds of reactors, preferably fluidized-bed reactors, may be used for this purpose, and the gas to be desulfurized is preferably preheated before being fed to such reactor. This desulfurization is preferably effected at temperatures above 600° C.

An example of the process of the invention will be described with reference to the drawing.

The supply bin 1 contains the fine-grained material to be subjected to dry distillation. This material consists, e.g., of tar sand to which dolomite or limestone ground to a particle size of 0-3 mm have been added in small quantities so that the mixture contains at least 0.2% by weight $MgCO_3$ and or $CaCO_3$. Depending on the sulfur content of the material to be subjected to dry distillation, and on its natural content of $CaCO_3$ (CaO) and $MgCO_3$ (MgO), about 0–30 kg limestone or dolomite are added per ton. This material flows, e.g., through a conduit 2 into a mixer 3, where it is mixed with hot dry distillation residue from conduit 4. The dry distillation residue is at a temperature of 600°–850° C. The mixer may be a known mixer having two shafts which rotate in the same direction.

In the mixer 3, the material from the supply bin 1 is mixed with the hot dry distillation residue and is thus heated so that the oil-containing or bituminous material is distilled off. The mixture is at a temperature of 450°–650° C. The mixture from the mixer 3 is collected in an interstage bin 5, in which it may be further degasified. The gases and vapors produced by dry distillation are removed through conduit 5a from the dry distillation zone and are subjected to dust collection in cyclone 6. Part of the fine-grained dry distillation residue flows from bin 5 in conduit 7 to the lower end of the vertical pneumatic conveyor line 8. Any surplus dry distillation residue is withdrawn from the dry distillation plant through conduit 7a.

In the conveyor line 8, the carbon contained in the dry distillation residue is partly burnt with air from conduit 9. By the hot flue gases, the dry distillation residue is raised in the conveyor line 8 and is heated at the same time. Additional fuel, which is not required in all cases, may be fed in conduit 9a. Additional fuel may consist of gas or oil produced in the same plant or of fuel from another source, e.g., coke dust which has a certain sulfur content and could be used for other purposes only with difficulty. Where a solid fuel, such as coke, is used, it may be fed to the process together with the feedstock.

The gases in the conveyor line 8 entrain the dry distillation residue to the collecting vessel 10. The residue time of the gases in the conveyor line is about 0.5–4 seconds.

In the example shown on the drawing, the lower portion of the vessel 10 consists of a fluidized-bed chamber 10a. A partition 11 in the vessel 10 deflects the conveying gases so that the entrained dry distillation residue is separated and collects in the fluidized-bed chamber 10a. The conveying gases leave the vessel 10 through a conduit 12, which may lead, e.g., to waste heat-utilizing means and dust-collecting means, not shown. The gases have only a small residual $SO_2$ content so that a further desulfurization is often not required.

In the fluidized-bed chamber 10a of the collecting vessel 10, the dry distillation residue is heated further to its maximum temperature. For this purpose, air is fed into the fluidized-bed chamber 10a through a conduit 13 and flows through the grate 14 in the chamber 10a into the dry distillation residue disposed above said grate and residual carbon in the dry distillation residue is burnt. Any additional fuel required may also be fed to the fluidized-bed chamber 10a. In many cases, afterheating is not required so that the lower portion of the collecting vessel 10 need not constitute a fluidized-bed chamber.

The $MgCO_3$ or $CaCO_3$ which has been fed to the dry distillation zone together with the material from the supply bin 1 which is to be subjected to dry distillation eliminates $CO_2$ as a result of the heating mainly in the conveyor line 8 and possibly also in the collecting vessel 10 and can then combine with $SO_2$ to form the innocuous solids $MgSO_4$ or $CaSO_4$. The resulting sulfates are discharged in part as dust together with the exhaust gases through the conduit 12; the remainder remains in the dry distillation residue. Sulfur will not be eliminated from the sulfates because this would require temperatures far higher than 1000° C, as a rule.

After dust collection in cyclone 6, the dry distillation products are fed through conduit 15 to succeeding condensing means 19. Liquid condensate is withdrawn through conduit 20. The uncondensed gases which contain $H_2S$ are preheated by means not shown and then fed to the reacher 16, in which they are contacted with hot dry distillation residue from conduit 17 and are thus desulfurized. They are then fed through conduit 18 for further utilization.

After dust collection in cyclone 6, the gases and vapors produced by dry distillation may alternatively be fed directly to the reactor 6 through conduit 15.

EXAMPLE

In a process as illustrated on the drawings, 3 tons of dry distillation residue per ton of tar sand are conducted at a temperature of 750° C from the collecting vessel 10 into a double-shaft mixer 3. Fine-grained dolomite ($MgCO_3$) in a proportion of 10 kg ton were previously added to the tar sand, which was initially free from carbonate. At the end of the mixing zone, the mixture has assumed a temperature of 520° C and at this temperature flows into the intermediate bin 5, where it is further degasified. The dry distillation residue flowing out of the bin 5 is partly conducted in conduit 7 to the lower end of the pneumatic conveyor line 8 and partly withdrawn through conduit 7a.

In the conveyor line 8 and, if desired, also in the collecting vessel 10, the dry distillation residue is reheated to 750° C as a result of the feeding of air and fuel. Exhaust gas becomes available at a rate of 280 standard $m^3$ per ton of tar sand, which contains 5.9 kg sulfur. This exhaust gas is withdrawn from vessel 10 through conduit 12. Because the sulfur is contained in the organic substance of the tar sand and about 20% of this organic substance are burnt in the conveyor line, the exhaust gas would have a sulfur content of about 3000% by volume $SO_2$. For ecological reasons, such exhaust gas must not be discharged into the atmosphere in most cases. Because the added $MgCO_3$ eliminates $CO_2$, MgO is formed, which subsequently combines with about 80% of the $SO_2$ to form $MgSO_4$ so that the $SO_2$ content of the exhaust gases is decreased to about 600 volume ppm.

What is claimed is:

1. A dry distillation process which comprises treating bituminous or oil-containing fine-grained material in a distillation zone with a heat carrier comprising fine-grained dry distillation residue which is heated in a pneumatic conveyor line by hot combustion gases and then fed to a collecting vessel to remain in said collecting vessel for a residence time of 1-40 minutes at a temperature in the range of 750°-850° C, continuously withdrawing distillation residue from said collecting vessel and mixing same in the dry distillation zone with the bituminous or oil-containing fine-grained material, said material containing at least 0.2 percent by weight of magnesium carbonate or calcium carbonate or a mixture of said carbonates, withdrawing distillation products from said distillation zone and feeding said withdrawn dry distillation residue to the inlet of the pneumatic conveyor line to be reheated therein and withdrawing exhaust gases from said collecting vessel, said exhaust gases having a small residual sulfur dioxide content.

2. Process of claim 1 wherein magnesium carbonate as dolomite and calcium carbonate as limestone are admixed to the material to be subjected to dry distillation.

3. Process of claim 1 wherein the collecting vessel constitutes a fluidized-bed chamber for heating dry distillation residue.

4. Process of claim 1 wherein fuel contained in the dry distillation residue with or without additional fuel is used to heat the dry distillation residue in the pneumatic conveyor line and in the collecting vessel.

5. Process of claim 1 wherein part of the heated dry distillation residue from the collecting vessel is used to desulfurize the gases and vapors produced by dry distillation.

6. Process of claim 1 wherein a mixture at a temperature of 450°-650° C is produced in the dry distillation zone.

7. Process of claim 1 wherein the residence time of the gas in the conveyor line is 0.5-4 seconds.

8. Process of claim 1 wherein the dry distillation residue is afterheated in the collecting vessel.

9. Process of claim 8 wherein air for afterheating the dry distillation residue is fed into the collecting vessel.

* * * * *